United States Patent
Anderson et al.

(10) Patent No.: US 10,363,842 B2
(45) Date of Patent: Jul. 30, 2019

(54) VEHICLE ANCHOR SYSTEM FOR JUVENILE SEAT BASE

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 340 days.

(21) Appl. No.: 15/261,234

(22) Filed: Sep. 9, 2016

(65) Prior Publication Data

US 2017/0072819 A1  Mar. 16, 2017

Related U.S. Application Data

(60) Provisional application No. 62/217,227, filed on Sep. 11, 2015.

(51) Int. Cl.
  *B60N 2/28* (2006.01)

(52) U.S. Cl.
  CPC ........... *B60N 2/286* (2013.01); *B60N 2/2806* (2013.01)

(58) Field of Classification Search
  CPC .............................. B60N 2/286; B60N 2/2806

USPC ..................................................... 297/256.16
See application file for complete search history.

(56) References Cited

U.S. PATENT DOCUMENTS

| | | | |
|---|---|---|---|
| 6,428,100 B1 | 8/2002 | Kain et al. | |
| 6,508,510 B2 * | 1/2003 | Yamazaki | B60N 2/2806 297/250.1 |
| 6,863,345 B2 | 3/2005 | Kain | |
| 7,887,129 B2 * | 2/2011 | Hei | B60N 2/2806 297/256.13 |
| 7,926,874 B2 | 4/2011 | Hendry | |
| 7,988,230 B2 | 8/2011 | Heisey et al. | |
| 8,262,131 B2 | 9/2012 | Misikir et al. | |
| 8,262,161 B2 * | 9/2012 | Fritz | B60N 2/2806 297/253 |
| 8,690,244 B2 * | 4/2014 | Fritz | B60N 2/2806 297/253 |

FOREIGN PATENT DOCUMENTS

| | | | | |
|---|---|---|---|---|
| EP | 1077152 A2 * | 2/2001 | | B60N 2/2806 |
| EP | 1493616 A2 * | 1/2005 | | B60N 2/2806 |

\* cited by examiner

*Primary Examiner* — Anthony D Barfield
(74) *Attorney, Agent, or Firm* — Barnes & Thornburg LLP

(57) ABSTRACT

A child restraint includes a seat-support frame adapted to set on a passenger seat and retained on the passenger seat using an anchor belt. A juvenile seat included in the child restraint is configured to be mounted in a stationary position on the seat-support frame. The anchor belt can be a lap belt associated with the passenger seat.

8 Claims, 12 Drawing Sheets

US 10,363,842 B2

VEHICLE ANCHOR SYSTEM FOR JUVENILE SEAT BASE

PRIORITY CLAIM

This application claims priority under 35 U.S.C. § 119(e) to U.S. Provisional Application No. 62/217,227, filed Sep. 11, 2015, which is expressly incorporated by reference herein.

BACKGROUND

The present disclosure relates to juvenile vehicle seats, and particularly to a base for use with juvenile vehicle seats. More particularly, the present disclosure relates to a system for anchoring the base in a fixed position on a passenger seat in a vehicle.

Juvenile vehicle seats are used to transport young children in automobiles or other vehicles. These seats are often adapted to set on a juvenile-seat base which rests on a passenger seat in a vehicle. Seats for infants are adapted to face in a rearward direction toward a seat back of the passenger seat. Seats for older children are adapted to face in a forward direction away from the seat back of the passenger seat. Convertible seats are adapted to be used in either rearwardly facing or forwardly facing directions. Bases for use with juvenile seats may be adapted to be used in the rearwardly facing direction only, the forwardly facing direction only, or in both the rearwardly and forwardly facing directions.

SUMMARY

In accordance with the present disclosure, a child restraint includes a seat-support frame adapted to set on a passenger seat of a vehicle and a juvenile seat mounted on the seat-support frame. In illustrative embodiments, a restorative frame tether is adapted to engage a vehicle lap belt in a low region near the bight of the passenger seat that is provided at the junction between a seat bottom and a seat back of the passenger seat. The restorative frame tether is also mounted to the seat-support frame for pivotable movement about a relatively high horizontal frame-pivot axis that is elevated above the vehicle lap belt so that the seat-support frame will pivot about the horizontal frame-pivot axis and be moved downwardly into a cushion included in the seat bottom during exposure of a vehicle carrying the passenger seat and the child restraint to an external impact.

In illustrative embodiments, the restorative frame tether includes a belt mount located in or near the seat bight of the passenger seat. The vehicle lap belt engages a convex outwardly facing topside belt-support surface of the belt mount to establish a low elevation ACTUAL BELT PATH that extends laterally across the seat bottom in or near to the seat bight of the passenger seat. The restorative frame tether also includes at least one frame-tether linkage that is coupled at a lower end thereof to the belt mount and at an upper end thereof to the seat-support frame at a pivot point that is aligned with the horizontal frame-pivot axis.

In illustrative embodiments, each frame-tether linkage of the restorative frame tether comprises at least one spring-biased extensible rod. This rod expands and contracts in length during installation of the child restraint on the passenger seat to simplify attachment of the vehicle lap belt to the belt mount. Each rod is spring biased towards full extension with a plurality of lock positions that prevent extension without actuation of a release button. Such that, once the vehicle lap belt has been installed downward force on the seat-support frame compresses the vehicle seat cushion and promotes compression of the spring biased extensible rod thereby tensioning the seat-support frame relative to the vehicle seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint comprising a juvenile seat (shown diagrammatically) and a juvenile-seat base including a seat-support frame that is configured to support the juvenile seat and a restorative frame tether that is coupled to the seat-support frame for pivotable movement about an elevated horizontal frame-pivot axis and is adapted to mate with a relatively low vehicle lap belt when the juvenile-seat base is mounted on a passenger seat in a vehicle and showing that the seat-support frame is arranged to rest on a seat bottom of a passenger seat of a vehicle at the start of a frame installation process before, as suggested in FIG. 4, an anchor belt such as a vehicle lap belt is coupled to a laterally extending belt mount included in the restorative frame tether to anchor the seat-support frame of the juvenile-seat base in a substantially stationary INSTALLED position on the passenger seat as shown in FIG. 5 and suggesting that a VIRTUAL BELT PATH that is elevated above the belt mount will be established by the restorative frame tether once the vehicle lap belt is coupled to the laterally extending belt mount as suggested in FIGS. 7, 11, and 12;

FIG. 2 is another perspective view of a portion of the juvenile-seat base of FIG. 1 taken from another point of view showing the laterally extending belt mount included in the restorative frame tether of the juvenile-seat base before the vehicle lap belt is mated with the belt mount that is positioned to lie near a seat bight formed at a junction provided between the seat bottom and back of the passenger seat;

FIG. 3 is an enlarged side elevation view of a portion of the juvenile-seat base of FIG. 1 showing a convex, curved, outwardly facing topside belt-support surface of the laterally extending belt mount before a vehicle lap belt is passed along an ACTUAL BELT PATH that extends over the belt mount and under the seat-support frame as suggested in FIGS. 4 and 5 to restrain the belt mount in an installed position on the passenger seat in close proximity to a junction (i.e., seat bight) provided between the seat bottom and back of the passenger seat;

FIG. 4 is a diagrammatic assembly view of components included in the restorative frame tether before they are coupled to laterally spaced-apart first and second side pivot anchor bars included in the seat-support frame and showing that the restorative frame tether comprises: (1) a belt mount, (2) left-side frame-tether linkage including a pivotable first D-shaped rod-support plate associated with the first side pivot anchor bar, a companion first-plate pivot axle for mating with the first side pivot anchor bar and supporting the first D-shaped rod-support plate for pivotable movement about the horizontal frame-pivot axis, and a pair of left-side spring-loaded extensible frame-tether rods arranged to extend between and mate with each of the belt mount and the pivotable first D-shaped rod-support plate, and (3) a right-side frame-tether linkage including a pivotable second D-shaped rod-support plate associated with the second side pivot anchor bar, a companion second-plate pivot axle for mating with the second side pivot anchor bar and supporting the pivotable second D-shaped rod-support plate for pivotable movement about the horizontal frame-pivot axis, and a pair of right-side spring-loaded extensible frame-tether rods arranged to extend between and mate with each of the belt mount and the pivotable second D-shaped rod-support plate and suggesting that the vehicle lap belt will be passed along an ACTUAL BELT PATH over a convex outwardly facing topside belt-support surface of the belt mount to engage that belt-support surface and hold the belt mount of the restorative frame tether in closely confronting relation to the seat bight of the passenger seat so that the seat-support frame is held normally in an INSTALLED position on a passenger seat by the spring-loaded extensible frame-tether rods as shown, for example, in FIGS. 5-10 and suggesting that the restorative frame tether is configured and arranged to establish a VIRTUAL BELT PATH that extends in part along the horizontal frame-pivot axis and lies above the ACTUAL BELT PATH;

FIG. 5 is a top perspective view showing engagement of a vehicle lap belt on the convex outwardly facing topside belt-support surface of the belt mount to hold the belt mount of the restorative frame tether normally against the passenger seat while the left-side and right-side spring-biased extensible frame-tether rods cooperate to draw the seat-support frame toward the belt mount and therefore toward seat bottom, seat back, and seat bight of the passenger seat to establish an INSTALLED position of the seat-support frame in the passenger seat;

FIG. 6 is a view similar to FIG. 5 showing an earlier first stage of installation before a bight portion of the seat-support frame is drawn toward a seat bight formed at the junction between the seat bottom and back of the passenger seat in the vehicle;

FIG. 7 is a view similar to FIG. 6 showing the seat-support frame held by the vehicle lap belt in an INSTALLED position on the passenger seat after the bight portion of the seat-support frame has been drawn into the seat bight by the spring-biased extensible frame-tether rods of the restorative frame tether and illustrating a VIRTUAL BELT PATH pivot point associated with the first-plate pivot axle of the pivotable first D-shaped rod-support plate and a VIRTUAL BELT PATH pivot axis (shown in phantom) that is elevated above and in spaced-apart relation to the relatively lower vehicle lap belt and is co-extensive with the horizontal frame-pivot axis that is arranged to extend through the plate pivot axles of the pivotable first and second D-shaped rod-support plates;

FIG. 8 is an enlarged side perspective view of a portion of the left side of the juvenile-seat base showing that the belt mount is drawn into the seat bight formed at the junction between the seat bottom and seat back by the vehicle lap belt and that the bight portion of the seat-support frame is drawn toward the seat bight by the restorative frame tether when the seat-support frame occupies the INSTALLED position;

Figure 9:
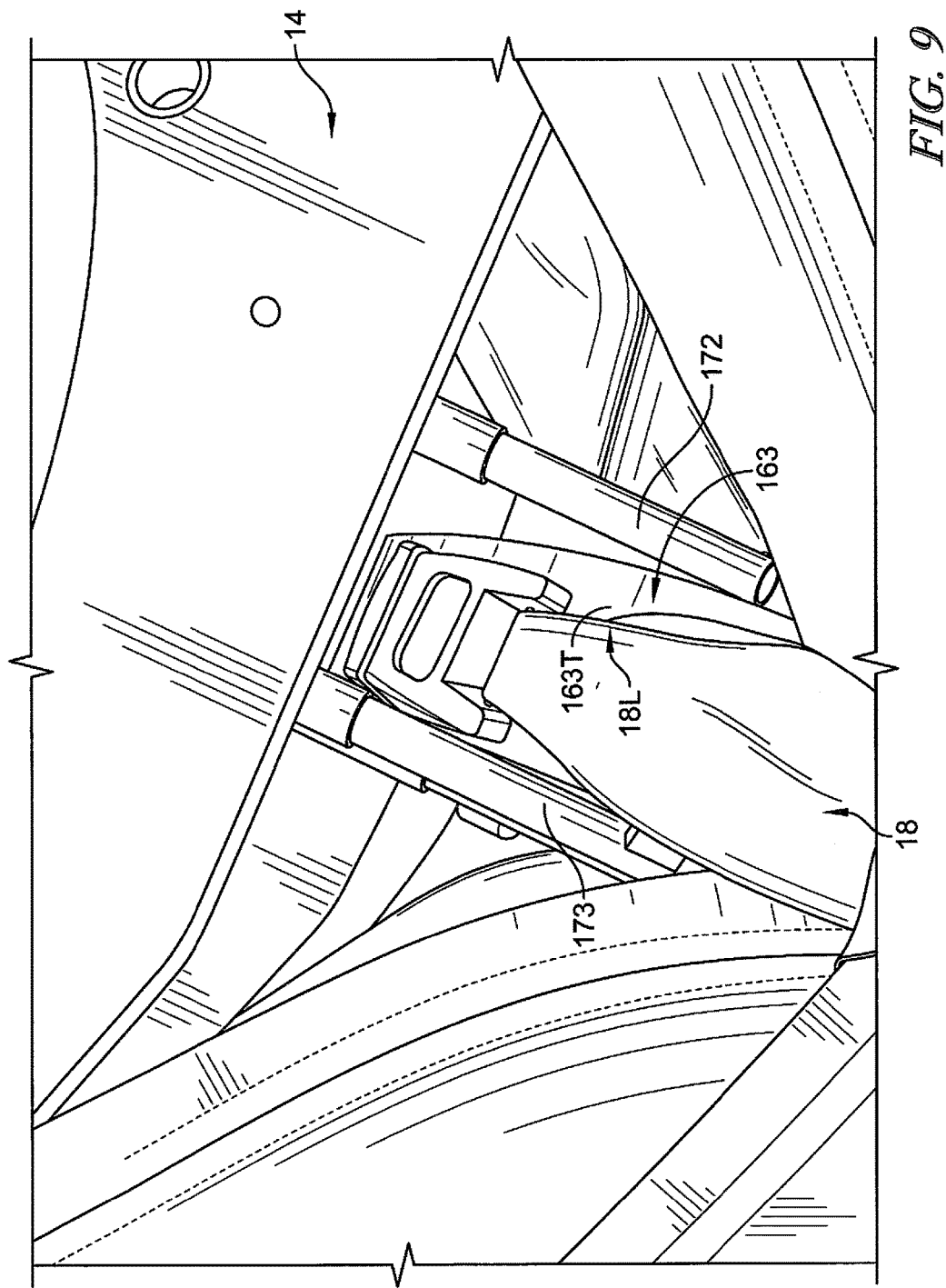
FIG. 9 is an enlarged side elevation view of the belt mount of FIGS. 5-8 showing that the vehicle lap belt extends on the belt mount along a curved ACTUAL BELT PATH and through a left-side channel provided between the pair of left-side spring-loaded extensible frame-tether rods included in the left-side mount linkage of the restorative frame tether.
Figure 10:
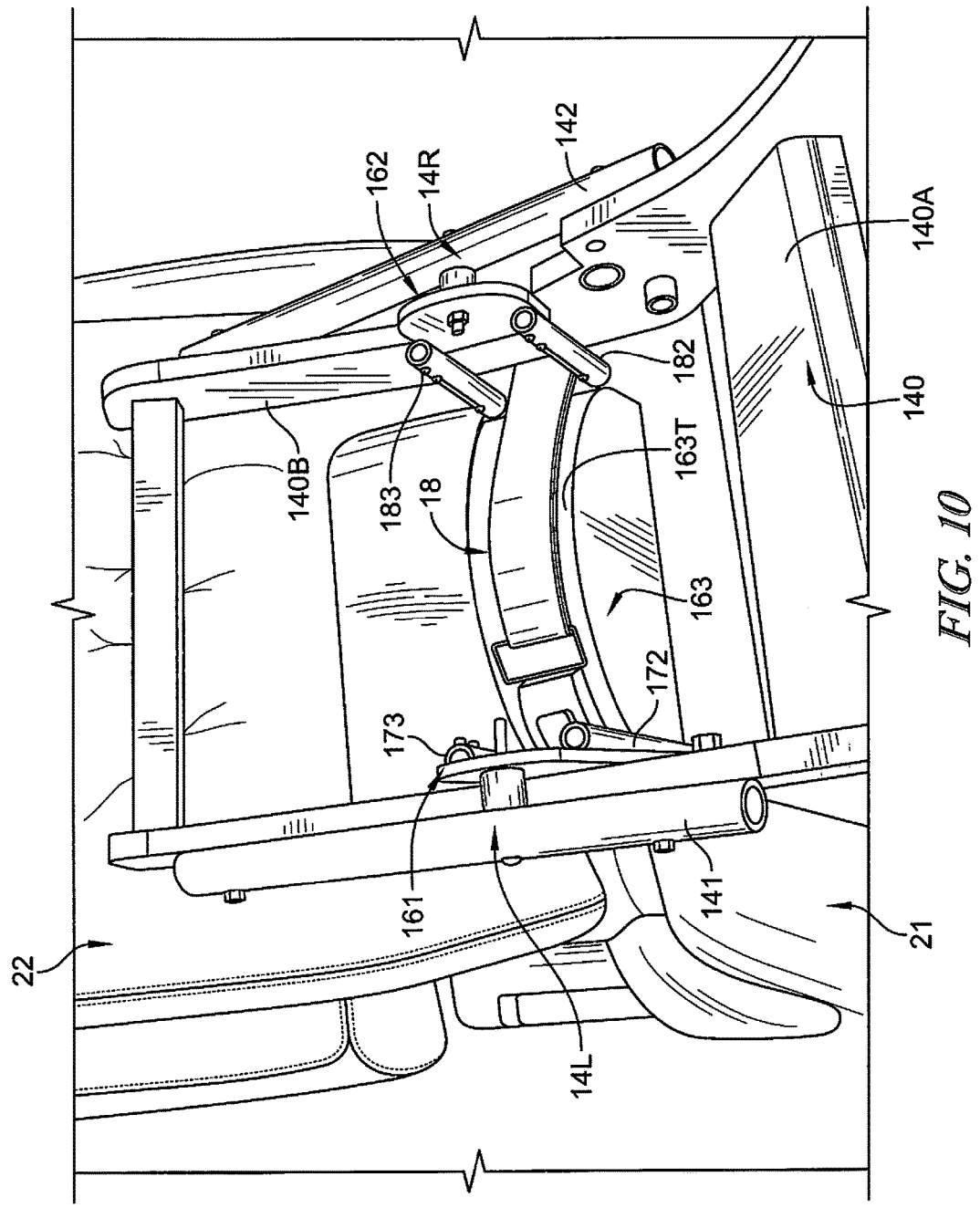
FIG. 10 is a front perspective view of the juvenile-seat base of FIGS. 5-9 showing that the vehicle lap belt also extends on the belt mount through a right-side channel provided between the pair of right-side spring-loaded extensible frame-tether rods included in the right-side mount linkage of the restorative frame tether.
Figure 11:
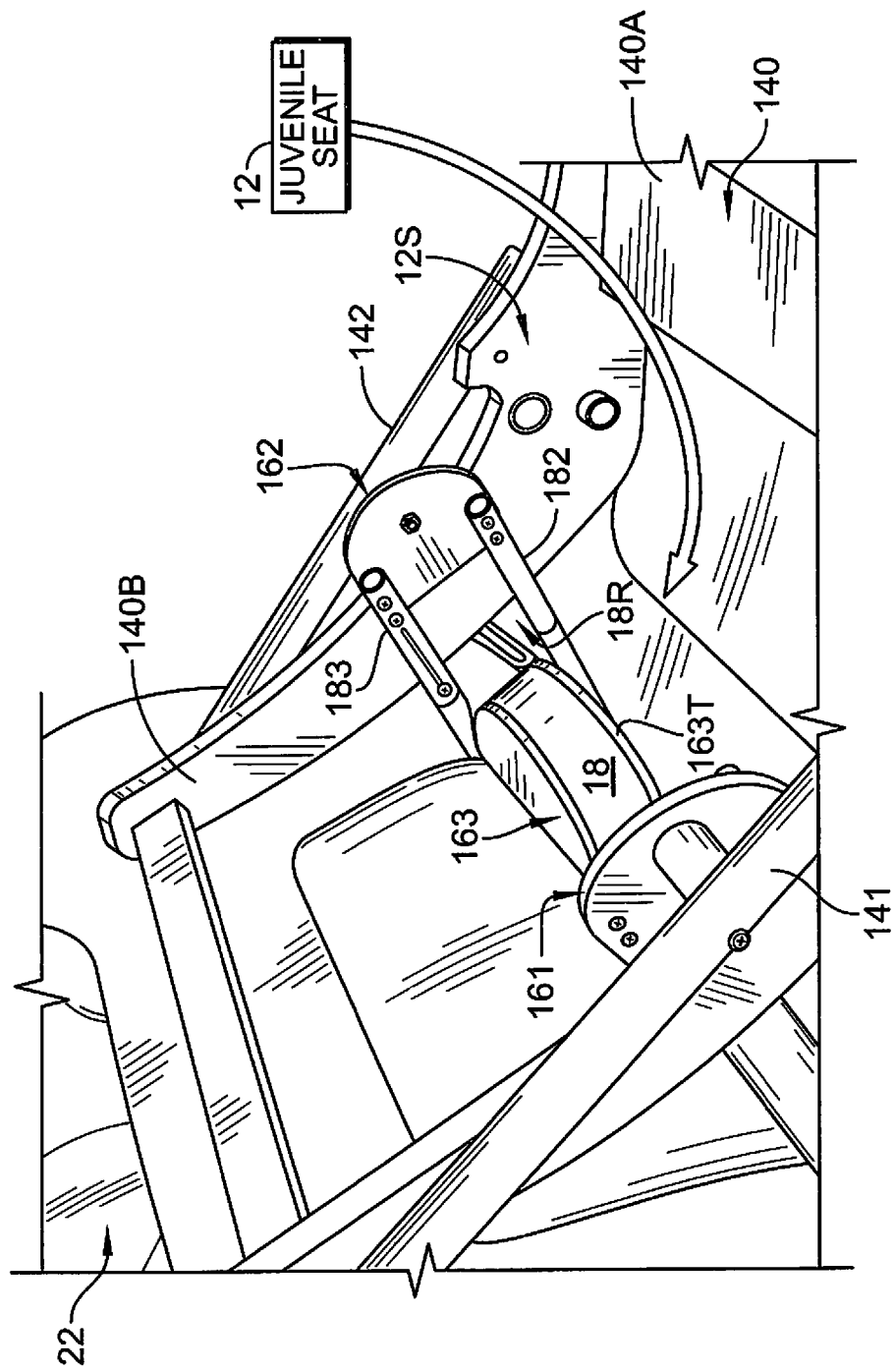
Figure 12:
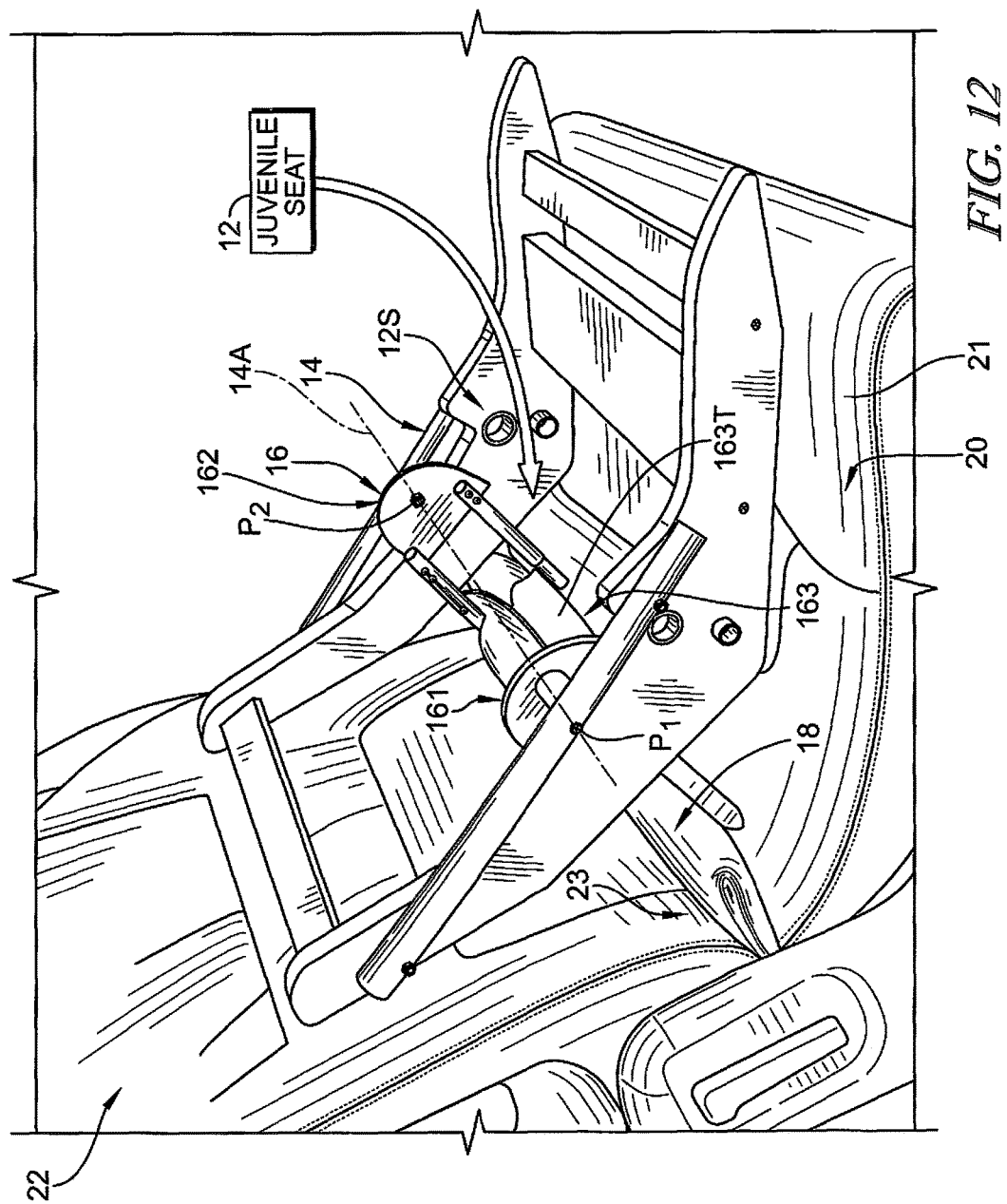

FIG. 11 is a perspective view of a forwardly displaced juvenile-seat base during exposure of the vehicle in which the juvenile-seat base is transported to an external impact and showing temporary lengthening of each of the right-side spring-biased extensible frame-tether rods included in the restorative frame tether during limited forward movement of the seat-support frame of the juvenile-seat base on the seat bottom of the passenger seat and away from the seat back and the seat bight from the INSTALLED position shown in FIGS. 5 and 7-10 to a temporarily DISPLACED position following that external impact to the vehicle; and FIG. 12 is a perspective view similar to FIG. 11 showing rotation (pivoting) of the seat-support frame about the relatively high horizontal frame-pivot axis (VIRTUAL BELT PATH) during exposure of a vehicle carrying the child restraint to an external impact to drive the seat support frame downwardly into the underlying seat bottom.

DETAILED DESCRIPTION

Figure 1:
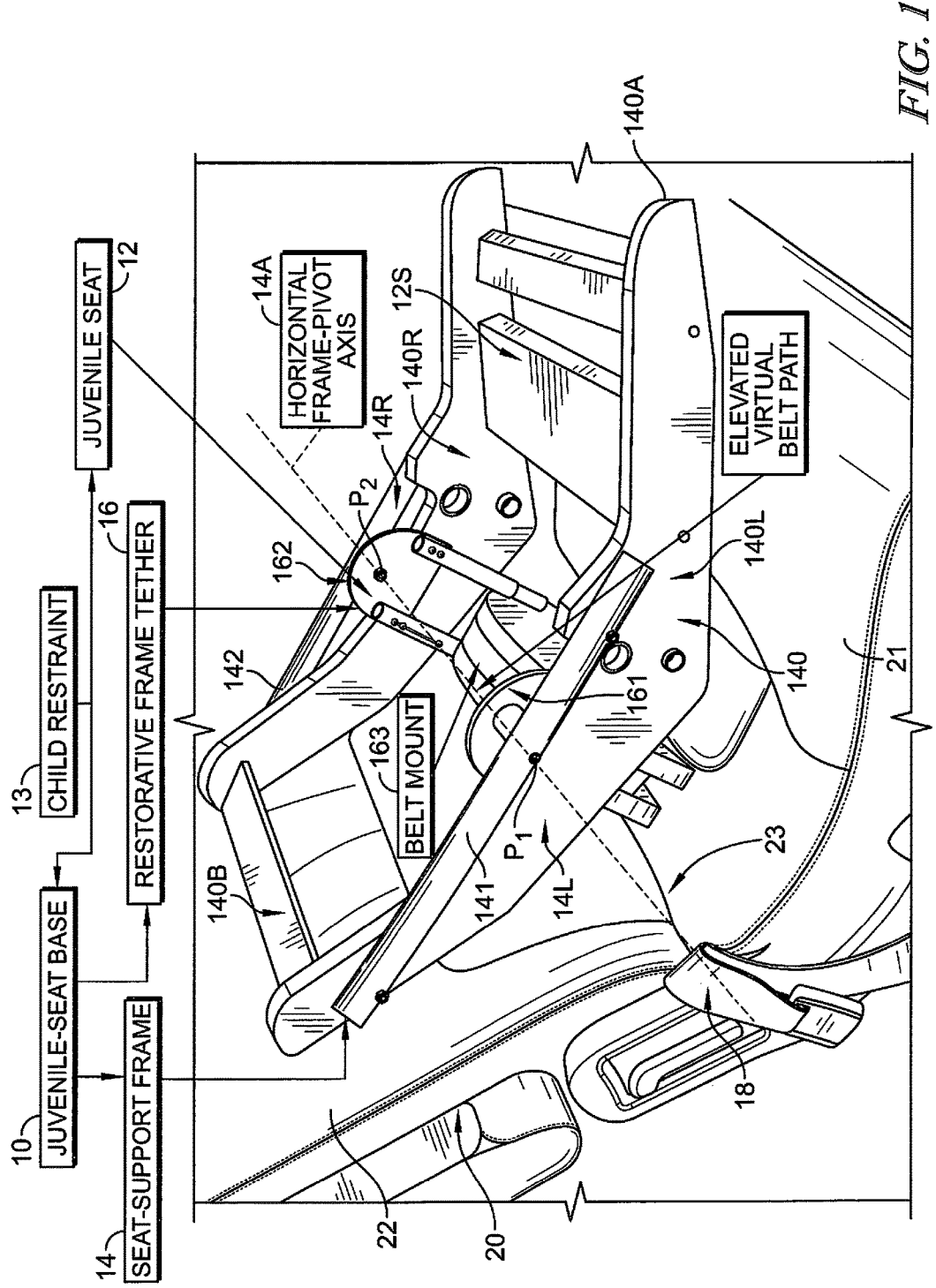
Figure 2:
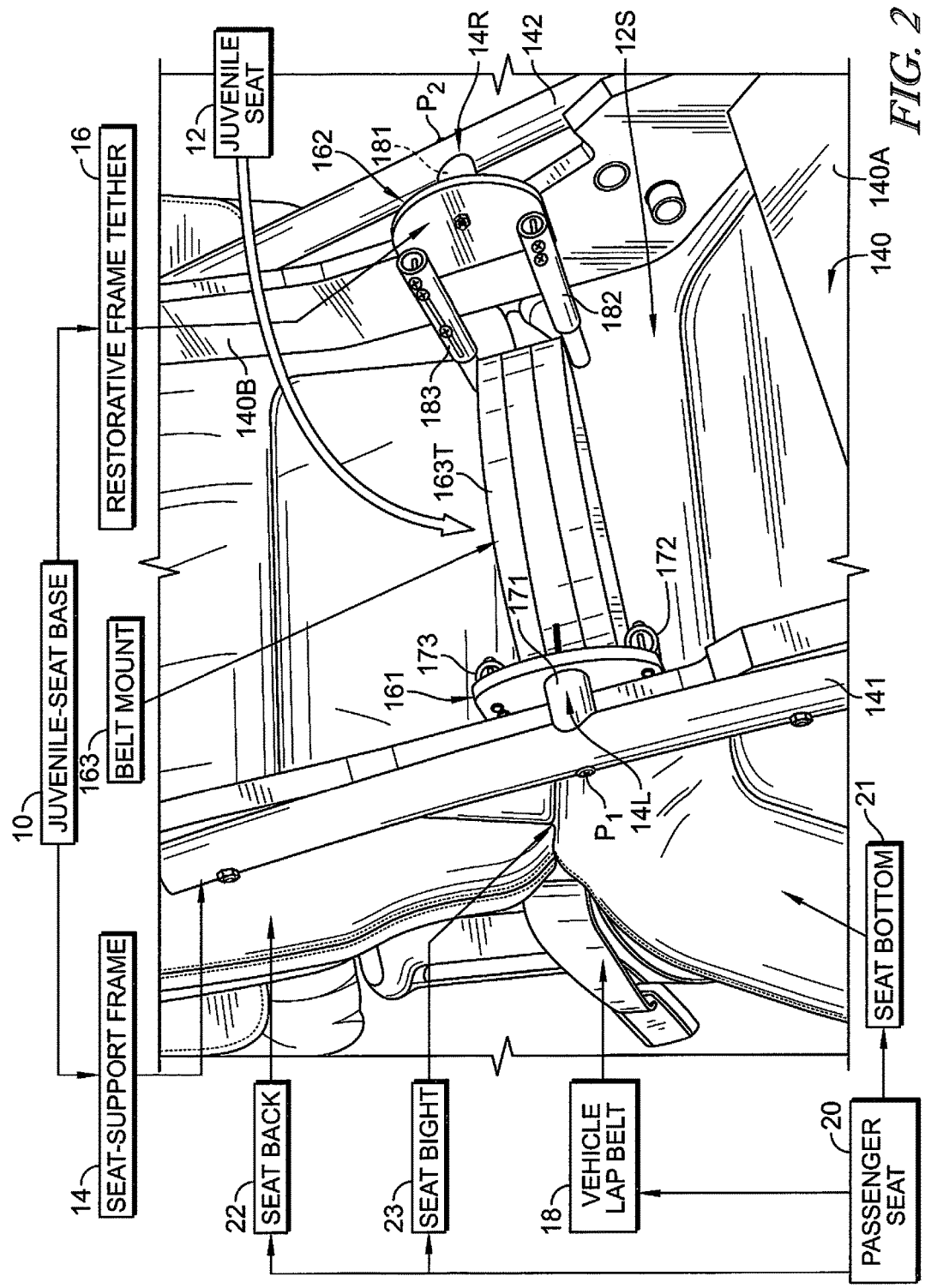
Figure 3:
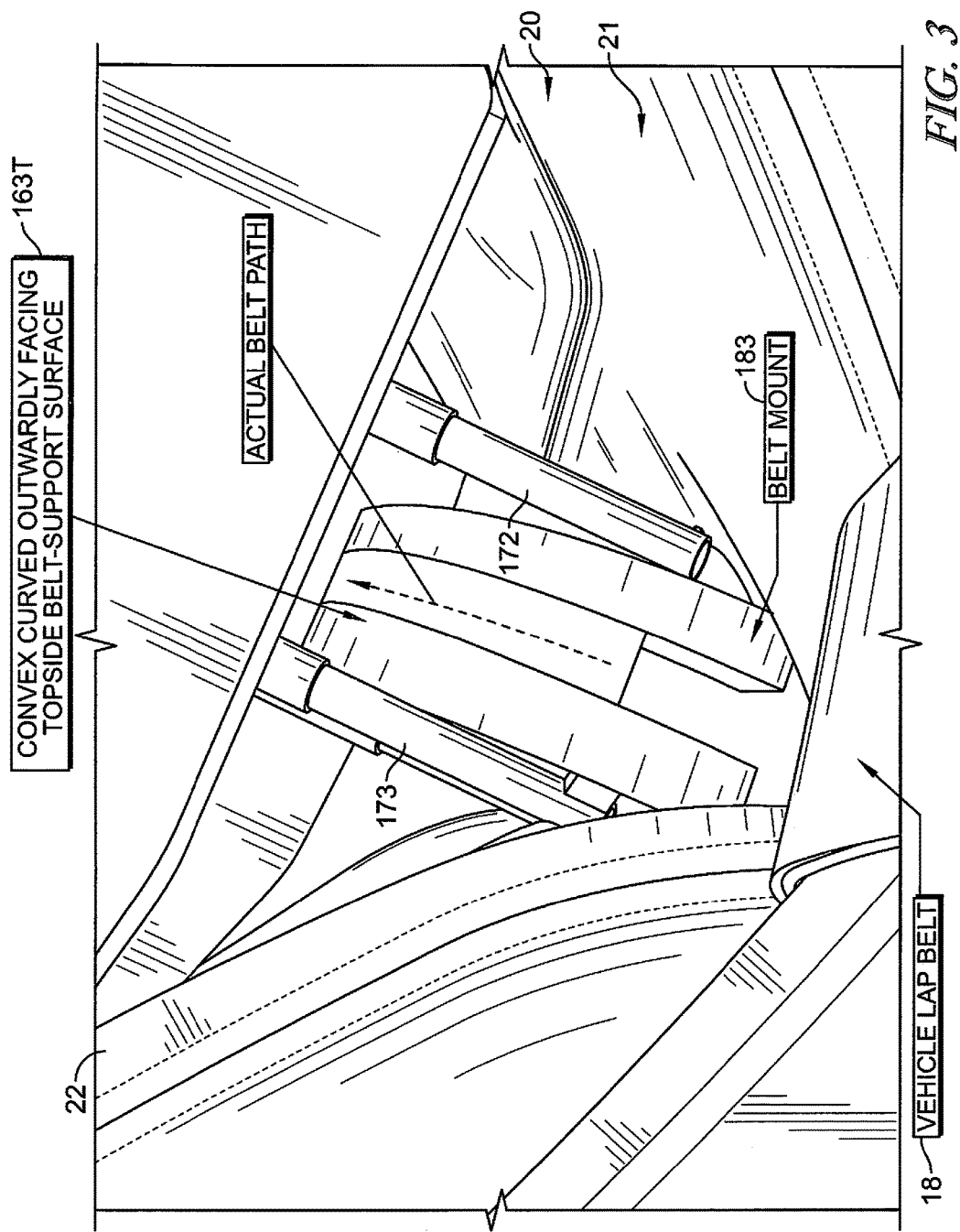

A juvenile-seat base 10 in accordance with the present disclosure cooperates with a juvenile seat 12 to form a child restraint 13 as suggested in FIG. 1. In illustrative embodiments, juvenile-seat base 10 comprises a seat-support frame 14 and a restorative frame tether 16 that is coupled to seat-support frame 14 as shown in FIGS. 1 and 2. In illustrative embodiments, an anchor belt such as a vehicle lap belt 18 is located under the juvenile seat 12 and is arranged to extend along an ACTUAL BELT PATH to retain juvenile-seat base 10 in an INSTALLED position on a passenger seat 20 as suggested in FIG. 5.

Figure 5:
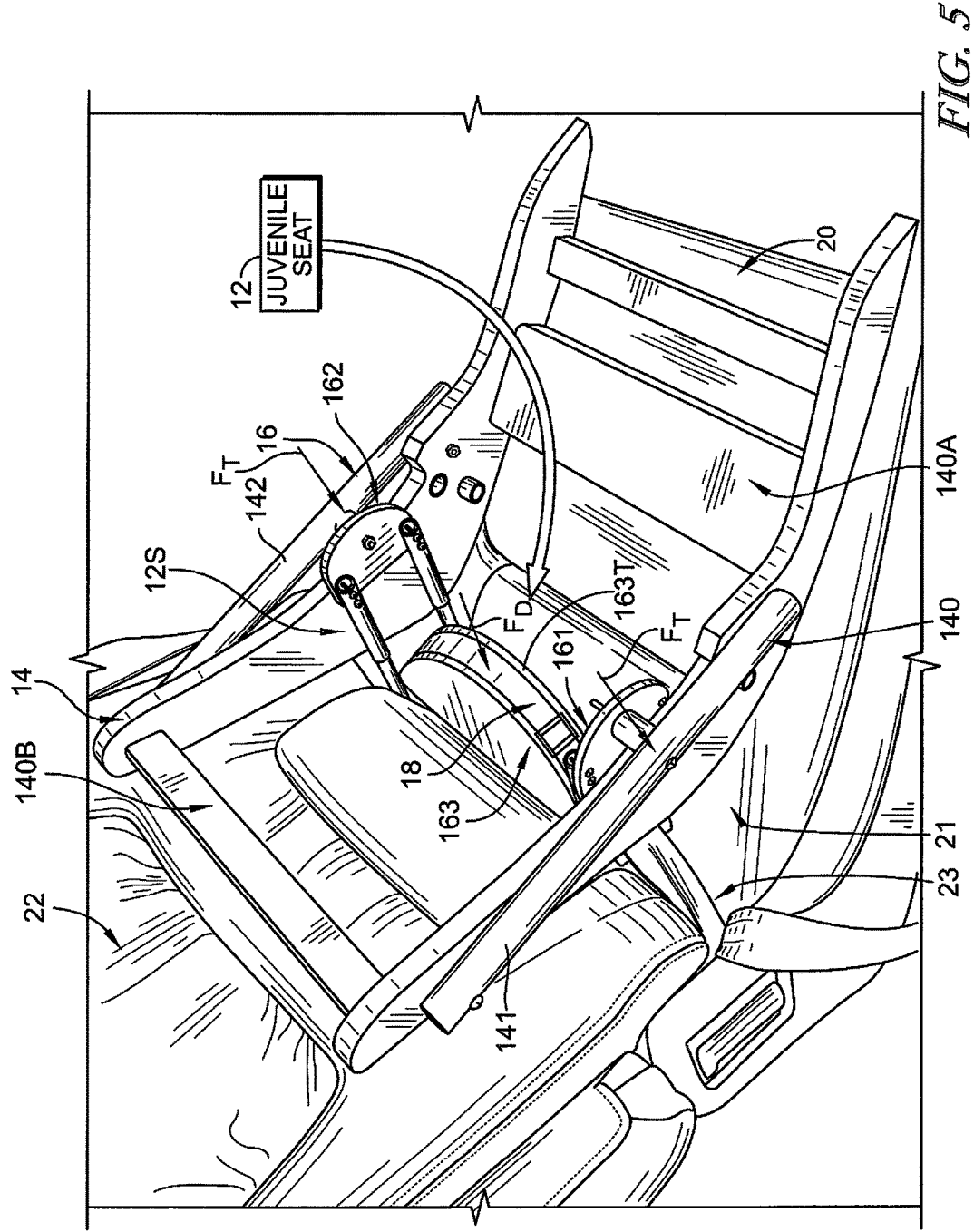
Figure 7:
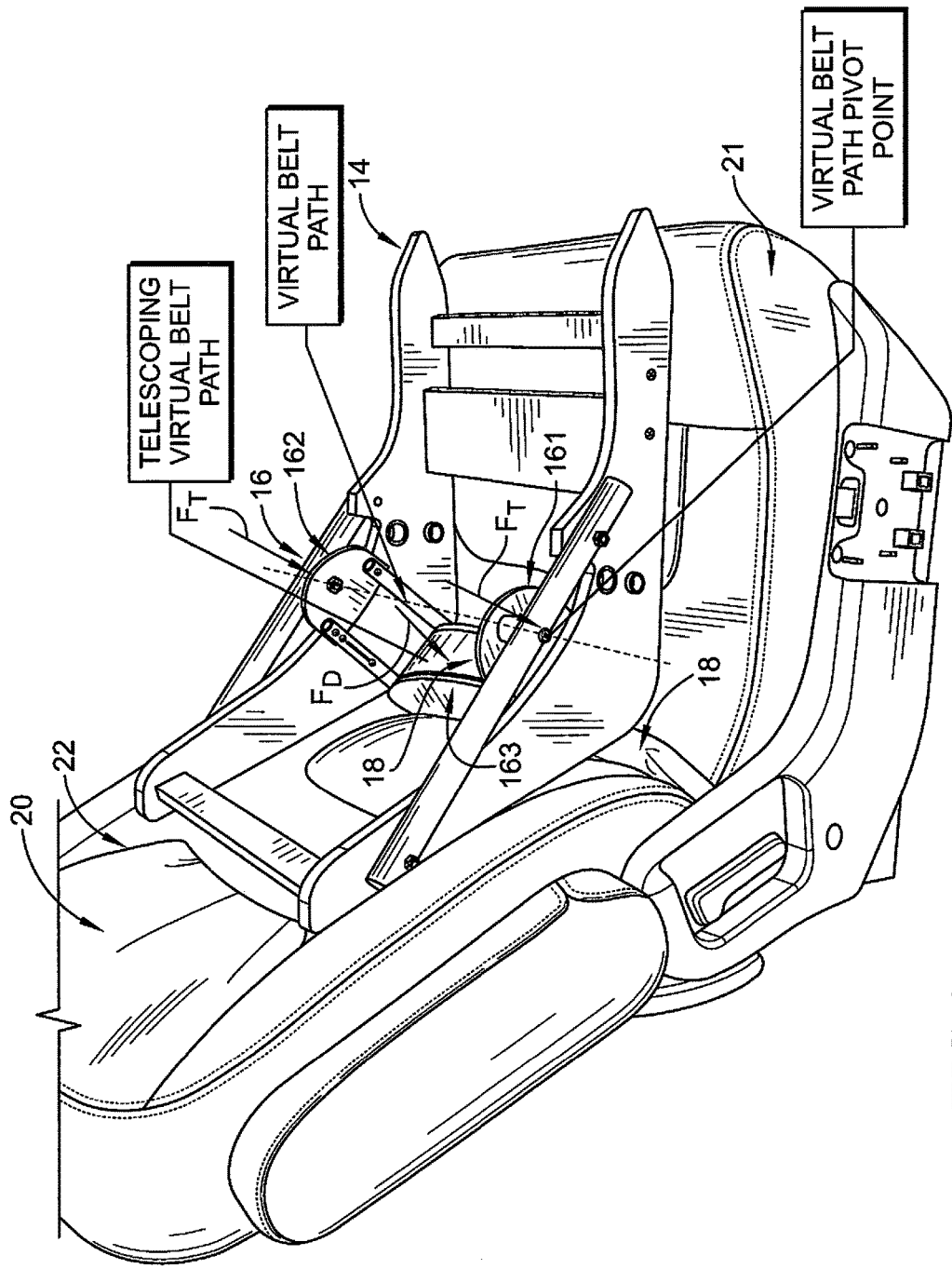
Figure 8:
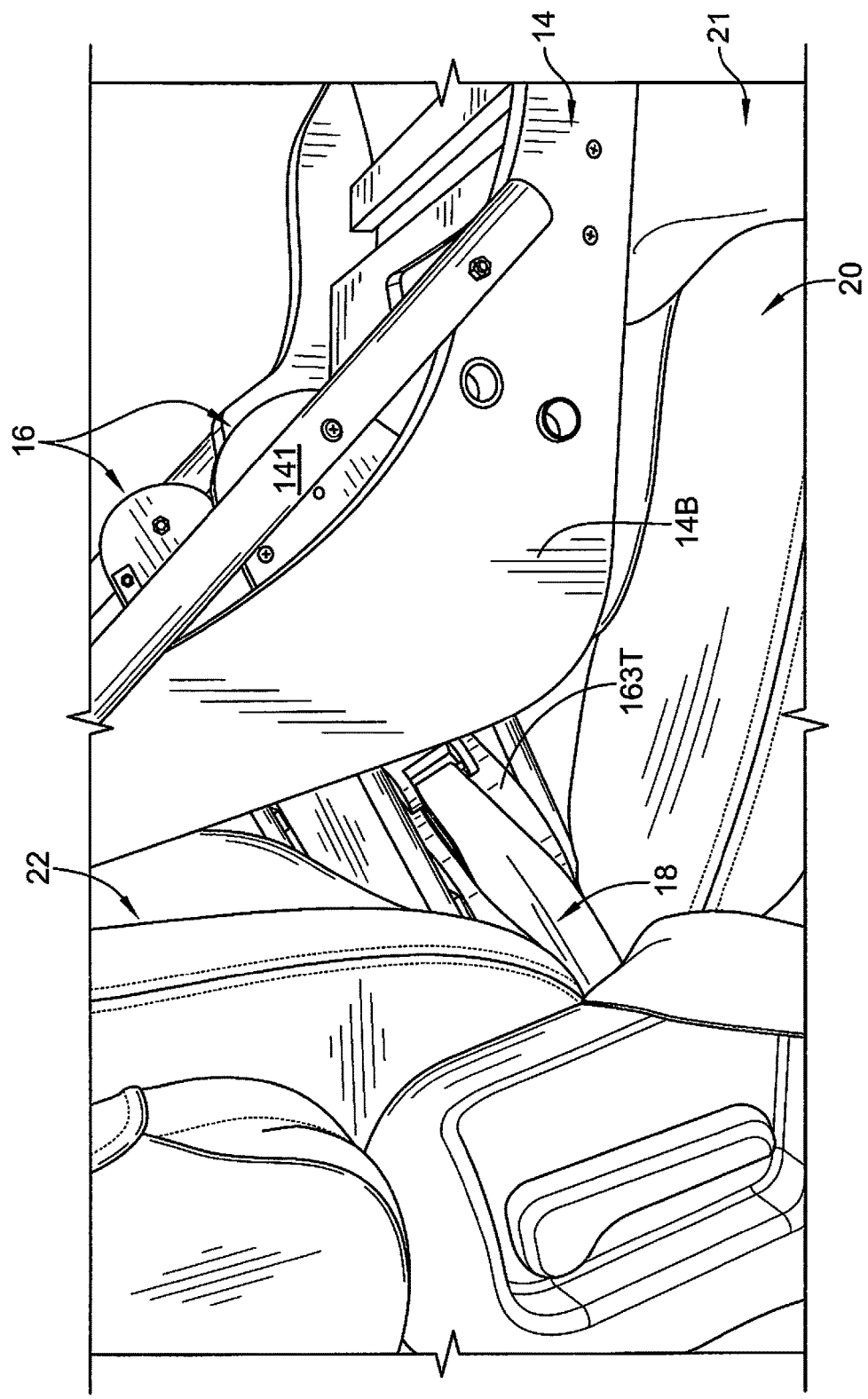

A restorative frame tether 16 in accordance with the present disclosure is configured to mate with vehicle or passenger-seat lap belt 10 in a region under juvenile seat 12 to allow vehicle lap belt 18 to remain in a relatively low position in close proximity to a seat bight 23 formed at a junction between a seat bottom 21 and a seat back 22 of passenger seat 20 while that vehicle lap belt 18 functions to retain juvenile-seat base 10 in the installed position on passenger seat 20 as shown, for example, in FIGS. 5 and 7. During exposure of a vehicle carrying passenger seat 20 to an external impact, seat-support frame 14 of juvenile-seat base 10 may be displaced on passenger seat 20 from the INSTALLED position shown in FIGS. 5 and 7-10 to assume a different temporary DISPLACED position as shown, for example, in FIG. 11. Restorative frame tether 16 functions as disclosed herein automatically to return (i.e. restore) seat-support frame 14 to the installed position on passenger seat 20 so that seat-support frame 14 is allowed to regain its former state or condition in the INSTALLED position on passenger seat 20.

Restorative frame tether 16 is also configured to extend upwardly and outwardly from vehicle lap belt 18 and mate with seat-support frame 14 at elevated pivot points $P_1$, $P_2$ as suggested in FIG. 7 to establish an elevated VIRTUAL BELT PATH, a portion of which is substantially co-extensive with a horizontal frame-pivot axis 14A that extends through elevated pivot points $P_1$, $P_2$. Elevated pivot point $P_1$ is located on a left side 14L of seat-support frame 14 to lie in laterally spaced-apart relation to the elevated pivot point $P_2$ that is located on an opposite right side 14R of seat-support frame 14 to provide a seat-receiving space 12S therebetween that is sized to receive a portion of juvenile seat 12 therebetween when juvenile seat 12 is mounted on seat-support frame 14 of juvenile-seat 12 as suggested in FIG. 7.

Figure 6:
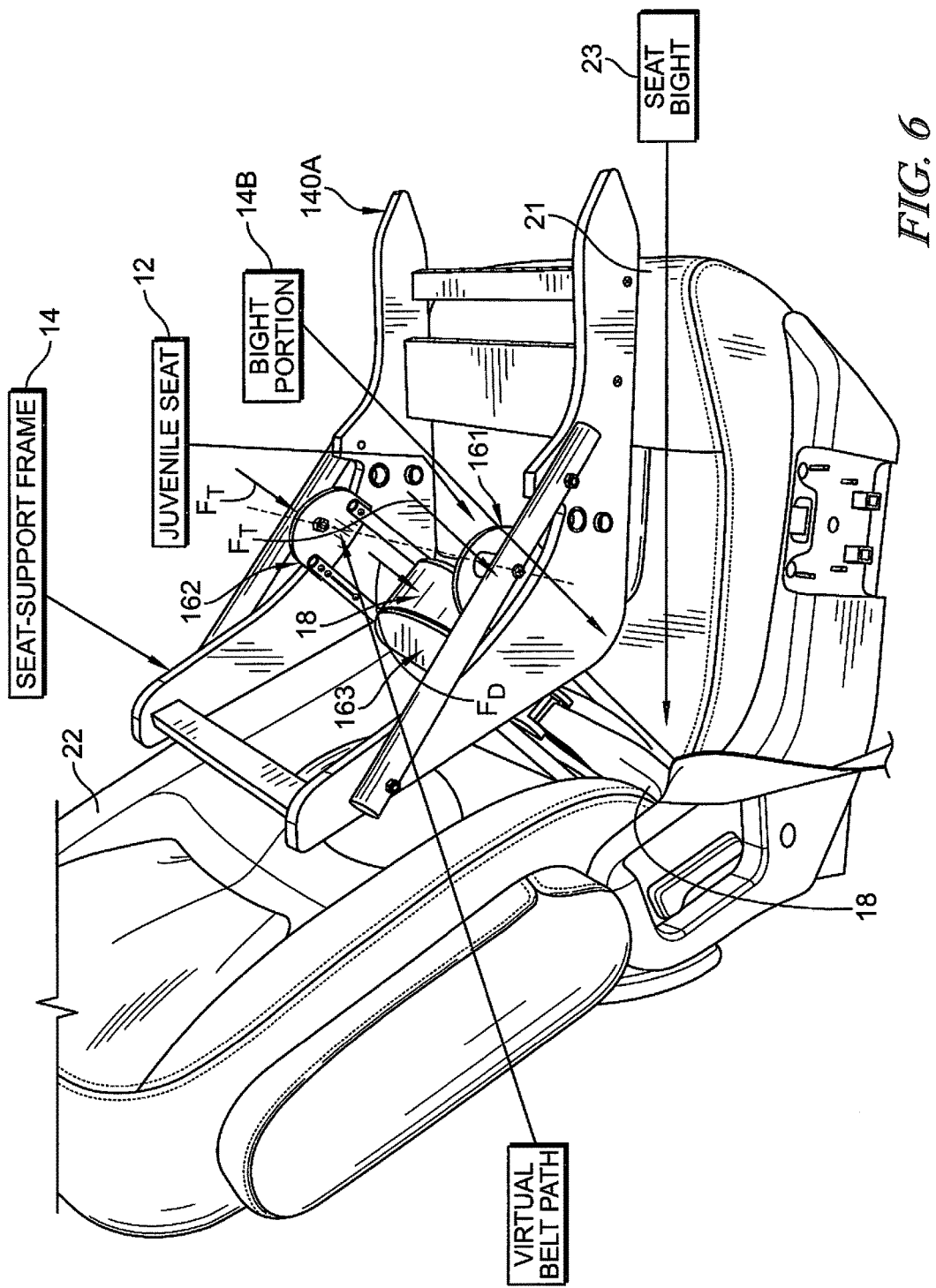

In Illustrative embodiments, restorative frame tether 16 is configured to establish a VIRTUAL BELT PATH that is elevated above vehicle lap belt 18 and that is arranged to pass through a portion of juvenile seat 12 mounted on juvenile-seat base 10 as suggested diagrammatically in FIG. 6. Thus, the vehicle lap belt 18 can extend laterally across seat bottom 21 of passenger seat 20 along an ACTUAL BELT PATH that is under juvenile seat 12 and juvenile seat 12 can be retained in a low position relative to seat-support frame 14 of juvenile-seat base 10 near seat bottom 21 of passenger seat 20 to maintain a low center of gravity (CG) of child restraint 13 while the restorative frame tether 16 extends upwardly and outwardly along left and right exterior side walls of juvenile seat 12 to mate with seat-support frame 14 at laterally spaced-apart pivot points $P_1$, $P_2$ to establish an elevated VIRTUAL BELT PATH that is above the ACTUAL BELT PATH followed by vehicle lap belt 18. As suggested in FIGS. 4 and 5, a portion of the VIRTUAL BELT PATH is arranged to lie between laterally spaced-apart pivot points $P_1$, $P_2$ in co-extensive relation with horizontal frame-pivot axis 14A.

Seat-frame support 14 includes a foundation 140 adapted to engage seat bottom 21 and seat back 22 of passenger seat 20, a first side pivot anchor bar 141 coupled to a left side 140L of foundation 140, and a second side pivot anchor bar 142 coupled to a right side 140R of foundation as shown, for example, in FIGS. 1, 5, and 7. Bars 141, 142 are arranged to lie in spaced-apart parallel relation to one another along a negatively sloping inclined reference plane as suggested in FIG. 6 in the illustrated embodiment. A lower end of each bar 141, 142 is coupled to a bottom-engaging portion 140A of foundation 140. An opposite upper end of each bar 141, 142 is coupled to a back-engaging portion 140B of foundation 140. When foundation 140 of seat-support frame 14 is placed on a passenger seat 20 of a vehicle, bottom-engaging portion 140A rests on seat bottom 21 and back-engaging portion 140B rests against seat back 22 as suggested in FIGS. 1, 5, and 7.

Restorative frame tether 16 is configured to tether seat-support frame 14 to vehicle lap belt 18 when juvenile-seat base 10 of child restraint 13 is mounted on passenger seat 20 of a vehicle as suggested in FIGS. 5 and 7. Restorative frame tether 16 is configured to cause seat-support frame 14 to regain the INSTALLED position on passenger seat 20 should seat-support frame 14 be moved temporarily to a DISPLACED position on passenger seat 20 following exposure of the vehicle carrying passenger seat 20 to an external impact as suggested in FIGS. 11 and 12. Restorative frame tether 16 is configured to establish an elevated VIRTUAL BELT PATH that extends, in part, along horizontal frame-pivot axis 14A and above an ACTUAL BELT PATH followed by vehicle lap belt 18 as suggested in FIG. 7. Juvenile seat 12 is coupled to seat-support frame 14 using any suitable means to lie as low as possible relative to seat-support frame 14 to establish a low center of gravity of child restraint 13. In illustrative embodiments, the VIRTUAL BELT PATH is arranged to intercept and extend through a portion of the juvenile seat 12 that is mounted on the seat-support frame 14 owing to the configuration of restorative frame tether 16 as suggested diagrammatically in FIG. 6.

Restorative frame tether 16 includes a left-side frame-tether linkage 161 coupled to inclined first side pivot anchor bar 141 at horizontal frame-pivot axis 14A and a right-side frame-tether linkage 162 coupled to inclined second side pivot anchor bar 142 of foundation 140 at horizontal frame-pivot axis 14A as suggested in FIGS. 1-4. Restorative frame tether 16 also includes a belt mount 163 coupled to a lower portion of each of linkages 161, 162 as suggested in FIGS. 1-4 to lie below and in spaced-apart relation to horizontal frame-pivot axis 14A.

Left-side frame-tether linkage 161 includes a pivotable first D-shaped rod-support plate 170 associated with first side pivot anchor bar 141, a companion first-plate pivot axle 171 for mating with first side pivot anchor bar 141 and supporting first D-shaped rod-support plate 170 for pivotable movement about horizontal frame-pivot axis 14A, and a pair of left-side spring-loaded extensible frame-tether rods 172, 173 arranged to extend between and mate with each of belt mount 163 and the pivotable first D-shaped rod-support plate 170. Although rod-support plate 170 is D-shaped in the illustrated embodiment, it is within the scope of the present disclosure to use any suitable shape.

Right-side frame-tether linkage 161 includes a pivotable second D-shaped rod-support plate 180 associated with second side pivot anchor bar 141, a companion second-plate pivot axle 181 for mating with second side pivot anchor bar 141 and supporting second D-shaped rod-support plate 180 for pivotable movement about horizontal frame-pivot axis 14A, and a pair of right-side spring-loaded extensible frame-tether rods 182, 183 arranged to extend between and mate with each of belt mount 163 and the pivotable second D-shaped rod-support plate 180. Although rod-support plate 180 is D-shaped in the illustrated embodiment, it is within the scope of the present disclosure to use any suitable shape.

Each extensible frame-tether rod 172, 173, 182, 183 is spring biased towards full extension with a plurality of lock positions that prevent extension without actuation of a release button. Such that, once the vehicle lap belt 18 has been installed downward force on the seat-support frame 14 compresses the vehicle seat cushion and promotes compression of the spring-biased extensible rods 172, 173, 182, 183 thereby tensioning the seat-support frame 14 relative to the vehicle seat 20

An early first stage of installation before a bight portion 14B of seat-support frame 14 is drawn into a seat bight 24 formed at the junction between seat bottom 21 and seat back 22 of passenger seat 20 in the vehicle is illustrated in FIG. 6. When vehicle lap belt 18 is tightened as suggested in FIGS. 5 and 7, seat-support frame 14 is moved to assume an INSTALLED POSITION on passenger seat 20.

A top perspective view is provided in FIG. 5 to show engagement of vehicle lap belt 18 on the convex outwardly facing topside belt-support surface 163T of belt mount 163. Such engagement is sufficient to hold belt mount 143 of restorative frame tether 16 normally against passenger seat 20 to establish an INSTALLED POSITION on passenger seat 20 while the left-side and right-side spring-biased extensible frame-tether rods 172, 173, 182, and 183 cooperate to draw seat-support frame 14 toward belt mount 163 and therefore toward seat bottom 21, seat back 22, and seat bight 24 of passenger seat 20.

Seat-support frame 14 is held by vehicle lap belt 18 in an INSTALLED POSITION on passenger seat 20 after bight portion 14B of seat-support frame 14 has been drawn into seat bight 24 by the spring-biased extensible frame-tether rods 172, 173, 182, and 183 as shown in FIG. 7. A VIRTUAL BELT PATH pivot point $P_1$ associated with the first-plate pivot axle 171 of the pivotable first D-shaped rod-support plate 170 and a VIRTUAL BELT PATH pivot axis (shown in phantom) that is elevated above and in spaced-apart relation to the relatively lower vehicle lap belt 18 and is co-extensive with the horizontal frame-pivot axis 14A that is arranged to extend through the plate pivot axles 171, 181 of the pivotable first and second D-shaped rod-support plates 170, 180 is also shown in FIG. 7.

Vehicle lap belt 18 extends along a curved path and through a left-side channel 18L provided between the pair of left-side spring-loaded extensible frame-tether rods 172, 173 included in the left-side frame-tether linkage 161 of the restorative frame tether 16 as shown in FIG. 9. Vehicle lap belt 18 also passes through a right-side channel 18R provided between the pair of right-side spring-loaded extensible frame-tether rods 182, 183 included in the right-side frame-tether linkage 162 of the restorative frame tether 16 as shown in FIG. 10.

A perspective view of a forwardly displaced juvenile-seat base 10 during exposure of the vehicle in which juvenile-seat base 10 is transported to an external impact is shown in FIG. 11. Temporary lengthening of each of the right-side spring-biased extensible frame-tether rods 182, 183 included in the restorative frame tether 16 occurs as shown in FIG. 11 during limited forward movement of seat-support frame 14 of juvenile-seat base 10 on seat bottom 21 of passenger seat 20 and away from seat back 21 and seat bight 24 following that external impact to the vehicle.

In accordance with the present disclosure, a child restraint 13 is provided with a combination of elements including a restorative frame tether 16 that functions to establish a VIRTUAL BELT PATH that is elevated above a vehicle lap belt 18 that is used to hold child restraint 13 on a passenger seat 20 in a vehicle and that extends or otherwise passes through the space 12S that is occupied by a juvenile seat 12 included in child restraint 13 and mounted on seat-support frame 14. Vehicle lap belt 18 cannot pass through that space 12S because the space 12S is occupied by juvenile seat 12. Instead, vehicle lap belt 18 passes under juvenile seat 12 and engages a belt mount 163 included in restorative tether 16 and exerts a downward force $F_D$ on belt mount 163, which force $F_D$ is transferred to the seat-support frame 14 as force $F_T$ at the elevated pivot points $P_1$, $P_2$ on seat-support frame 14 by the rest of the restorative frame tether 16 so as to establish the elevated VIRTUAL BELT PATH that extends, in part, along a horizontal frame-pivot axis 14A between pivot points $P_1$, $P_2$.

In accordance with the present disclosure, juvenile seat 12 and seat-support frame 14 can be retained in a very low position on vehicle seat 20 to keep the center of gravity of child restraint 13 as low as possible. A system of linkages 161, 162, 163 is included in restorative frame tether 16 to allow use of a low-elevation ACTUAL BELT PATH for vehicle lap belt 18 that creates the same belt path as if the vehicle lap belt 18 had instead wrapped over the top of first and second side pivot anchor bars 141, 142 at about pivot points $P_1$, $P_2$ to extend along a relatively high belt path above seat bottom 21. Any pivoting action of seat-support frame 14 (and juvenile seat 12) of the type that may occur in response to exposure of the vehicle carrying child restraint 13 to an external impact will take place along a horizontal frame-pivot axis 14A and an elevated VIRTUAL BELT PATH that extends along horizontal frame-pivot axis 14A between pivot points $P_1$, $P_2$. Restorative frame tether 16 cooperates with seat-support frame 14 in accordance with the present disclosure to establish a high VIRTUAL BELT PATH using a vehicle lap belt 18 that extends along a low ACTUAL BELT PATH. The low-elevation ACTUAL BELT PATH followed by vehicle lap belt 18 provides more access and room in space 12S inside seat-support frame 14 to allow for the lowest possible position of juvenile seat 12 in seat-support frame 14. This lowers the center of gravity of child restraint 13 in a desirable way.

During exposure of a vehicle carrying child restraint 13, seat-support frame 14 is free to rotate or pivot about the relatively high horizontal frame-pivot axis 14A (VIRTUAL BELT PATH) and thereby move relative to the underlying seat bottom 21 and seat back 22 while belt mount 163 is retained by vehicle lap belt 18 in a substantially stationary position in the bight 23 of the seat 20 as suggested in FIGS. 11 and 12. This relative motion results in the seat-support frame 14 being driven downwardly into the underlying seat bottom 21 to stabilize the child restraint 13 on the vehicle seat 20.

The VIRTUAL BELT PATH established by restorative frame tether 16 in cooperation with seat-support frame 14 illustratively is about eight inches from seat bight 23 on a 45 degree angle relative to the vehicle seating surface. Such a surface is defined by a surface on the child restraint 13 that the vehicle lap belt 18 passes over farthest from the vehicle seat bight 23. In accordance with the present disclosure, vehicle lap belt 18 is directed back toward the seat bight 23 so that it does not interfere with the portion of juvenile seat 12 that is placed between the ACTUAL BELT PATH and the elevated VIRTUAL BELT PATH.

In accordance with the present disclosure, a VIRTUAL BELT PATH is created by a linkage system 161, 162, 163 of restorative frame tether 16 in cooperation with seat-support frame 14 from a relatively lower ACTUAL BELT PATH to a higher point along horizontal frame-pivot axis 14A such that rotation (pivoting) of seat-support frame 14 about axis 14A and relative to vehicle seat 20 is closer to the center of gravity of child restraint 13 which will minimize movement of child restraint 13 on vehicle seat 20 during exposure of the vehicle carrying vehicle seat 20 and child restraint 13 to an external impact. Performance of child restraint 13 is measured in part by testing to standard FMVSS 213. The linkage system 161, 162, 163 of restorative frame tether 16 also allows for spring-biased telescoping motion of seat-support frame 14 relative to vehicle seat 20 to allow for ease of vehicle lap belt installation and then also for tensioning of the system. In accordance with the present disclosure, the position of vehicle lap belt 18 relative to seat-support frame 14 and vehicle seat 20 is optimized without compromising the low center of gravity position of the juvenile seat 12 relative to the seat-support frame 14 and the seat bight 23.

A child restraint 13 includes a juvenile-seat base 10 and a juvenile seat 12 as suggested in FIG. 1. Juvenile-seat base 10 includes a seat-support frame 14 and a restorative frame tether 16. Seat-support frame 14 is adapted to support juvenile seat 12 and to lie in an INSTALLED position on a seat bottom 21 and seat back 22 of a passenger seat 20 provided with a seat bight 23 formed at a junction between the seat bottom 21 and seat back 22 as suggested in FIGS. 1 and 2. Restorative frame tether 16 is mounted to seat-support frame 14 for pivotable movement about a high-elevation horizontal frame-pivot axis 14A and arranged to extend downwardly from the high-elevation horizontal frame-pivot axis 14A toward seat bottom 21 of passenger seat 20 when seat-support frame 14 lies in the INSTALLED position on passenger seat 20 as suggested in FIGS. 1, 2, 11, and 12.

Restorative frame tether 16 is configured to provide means for mating with an underside of a passenger-seat lap belt 18 associated with the passenger seat 20 to establish an actual belt path of the passenger-seat lap belt 18 while the passenger-seat belt 18 remains in a relatively lower low-elevation position in close proximity to seat bight 23 and below and in spaced-apart relation to the high-elevation horizontal frame-pivot axis 14A as suggested in FIG. 5. Restorative frame tether 16 is also configured to provide means for yieldably returning the seat-support frame 14 automatically to the installed position on seat bottom 21 and seat back 22 of passenger seat 20 owing to pivotable movement of restorative frame tether 16 about the high-elevation horizontal frame-pivot axis 14A after movement of seat-support frame 14 from the INSTALLED position to a temporary DISPLACED position on passenger seat 20 during exposure of passenger seat 20 to external forces as suggested in FIGS. 11, 12, 2, and 6.

Figure 4:
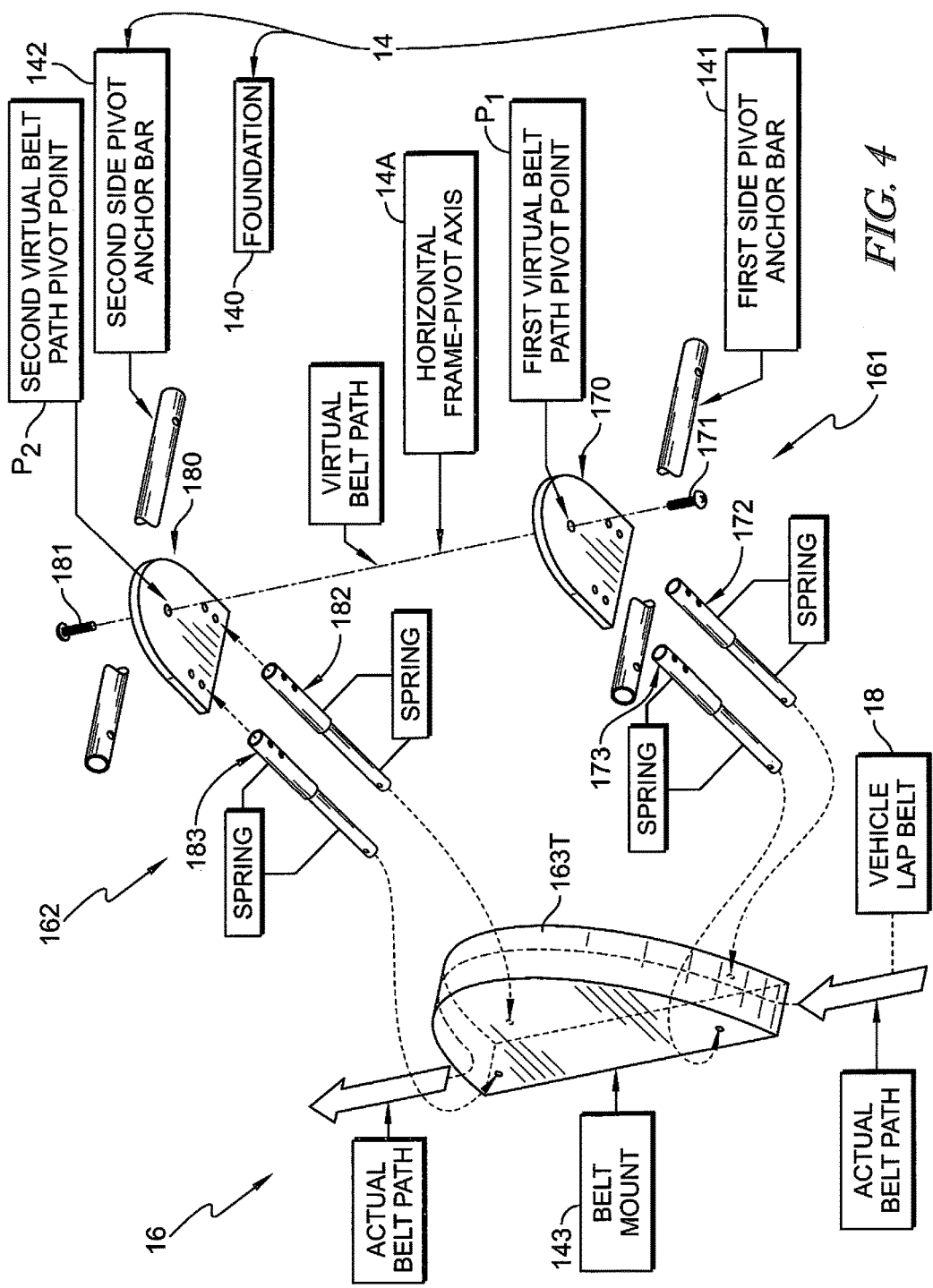

Restorative frame tether includes a belt mount 143 and first and second frame-tether linkages 161, 162 as shown, for example, in FIGS. 2 and 4. Belt mount 163 is adapted to engage a portion of the underside of the passenger-seat lap belt 18 as suggested in FIGS. 4 and 5. First frame-tether linkage 161 has a lower end pivotably coupled to a first end of belt mount 163 and an opposite upper end pivotably coupled to a first side of seat-support frame 14 at a first elevated pivot point $P_1$ that is located on the high-elevation horizontal frame-pivot axis 14A as suggested in FIG. 4. Second frame-tether linkage 162 has a lower end pivotably coupled to an opposite second end of belt mount 163 and an opposite upper end pivotably coupled to an opposite second side of seat-support frame 14 at a second elevated pivot point $P_2$ that is located on the high-elevation horizontal frame-pivot axis 14A and arranged to lie in spaced-apart relation to the first elevated pivot point $P_1$ to define a virtual belt path therebetween and along the high-elevation horizontal frame-pivot axis 14A as also suggested in FIG. 4.

Juvenile seat 12 is formed to include a child-receiving space 12S as suggested in FIGS. 2 and 5. Juvenile seat 12 is coupled to the seat-support frame 14 to lie in a stationary position as also suggested diagrammatically in FIGS. 2 and 5. An outer portion of the juvenile seat 12 extends into a seat-receiving cavity 12S formed in seat support frame 14 to position the outer portion above belt mount 163, between first and second frame-tether linkages 161, 162, and below first and second elevated pivot points $P_1$, $P_2$ as suggested diagrammatically in FIGS. 2 and 5.

First-side frame-tether linkage 161 includes a first rod-support plate 170 associated with the first side of the seat-support frame 14 and a first-plate pivot axle 171 arranged to mate with the first side of the seat-support frame 14 and support the rod-support plate 170 for pivotable movement about the high-elevation horizontal frame-pivot axis 14A as shown in FIG. 4. First-side frame-tether linkage 161 also includes at least one spring-loaded extensible frame-tether rod 172, 173 arranged to extend between and mate with each of the first end of belt mount 163 and first rod-support plate 170 as shown in FIG. 4.

Second-side frame-tether linkage 162 includes a second rod-support plate 180 associated with the second side of the seat-support frame 14 and a second-plate pivot axle 181 arranged to mate with the second side of seat-support frame 14 and support rod-support plate 180 for pivotable movement about the high-elevation horizontal frame-pivot axis 14A as shown in FIG. 4. Second-side frame-tether linkage 162 also includes at least one spring-loaded extensible frame-tether rod 182, 183 arranged to extend between and mate with each of the second end of belt mount 163 and second rod-support plate 180 as shown in FIG. 4.

Belt mount 163 includes a convex outwardly facing topside belt-support surface 163T adapted to engage a portion of the underside of the passenger-seat lap belt 18 normally to hold belt mount 163 against passenger seat 20 to establish the installed position of seat-support frame 14 on passenger seat 20 as suggested in FIG. 5. Each of the spring-loaded extensible frame-tether rods 171, 172, 182, and 183 is lengthened temporarily to load a spring included therein (as suggested in FIG. 4) during limited forward movement of seat-support frame 14 on the seat bottom of passenger seat 20 and away from the seat back 22 and the seat bight 23 following exposure of passenger seat 20 to an external impact and then shortened following unloading of the spring included in each of the spring-loaded extensible frame-support rods 171, 172, 181, and 182 to apply a downward force $F_T$ to the seat-support frame 14 to cause the seat-support frame 14 to be pivoted about the horizontal frame-pivot axis 14A and moved downwardly toward passenger seat 20 from the temporary DISPLACED position to the INSTALLED position.

First-side and second-side spring-biased extensible frame-tether rods 171, 172, 181, and 182 cooperate to provide means for yieldably drawing the seat-support frame 14 downwardly toward belt mount 163 and also toward the seat bottom 21, seat back 22, and seat bight 23 when the seat-support frame 14 is retained in the INSTALLED position. First-side and second-side spring-biased extensible frame-tether rods 171, 172, 181, and 182 also cooperate to provide a space 12S therebetween for receiving a portion of juvenile seat 12 and means for transferring a downward force $F_D$ exerted on belt mount 163 by a passenger-seat lap belt 18 mated with an outwardly facing topside belt-support surface 163T of the belt mount 163 to the seat-support frame 14 at the elevated pivot points $P_1$, $P_2$ so as to establish an elevated VIRTUAL BELT PATH that lies above the ACTUAL BELT PATH and extends in part, along the horizontal frame-pivot axis 14A between the first and second pivot points $P_1$, $P_2$ so that more room is provided between the first and second sides of the seat-support frame 14 to allow for a lowest possible position of the juvenile seat 12 in the seat-support frame 14 and the seat-support frame 14 can be retained in a low position on the passenger seat 20 to keep the center of gravity of the child restraint 13 close to the seat bottom 21 of the passenger seat 20.

The invention claimed is:

1. A child restraint comprising
a juvenile-seat base including a seat-support frame that supports a juvenile seat and is adapted to lie in an installed position on a seat bottom and seat back of a passenger seat provided with a seat bight formed at a junction between the seat bottom and seat back,
the juvenile-seat base also including a restorative frame tether mounted to the seat-support frame for pivotable movement about a high-elevation horizontal frame-pivot axis that is arranged to intercept and extend through a portion of the juvenile seat that is mounted on the seat-support frame and the restorative frame tether is arranged to extend downwardly from the high-elevation horizontal frame-pivot axis toward the seat bottom of the passenger seat when the seat-support frame lies in the installed position on the passenger seat, and
wherein the restorative frame tether is configured to provide means for mating with an underside of a passenger-seat lap belt associated with the passenger seat to establish an actual belt path of the passenger-seat lap belt while the passenger-seat belt remains in a relatively lower low-elevation position in close proximity to the seat bight and below and in spaced-apart relation to the high-elevation horizontal frame-pivot axis and for yieldably returning the seat-support frame automatically to the installed position on the seat bottom and seat back of the passenger seat owing to pivotable movement of the restorative frame tether about the high-elevation horizontal frame-pivot axis after movement of the seat-support frame from the installed position to a temporary displaced position on the passenger seat during exposure of the passenger seat to external forces.

2. A child restraint comprising a juvenile-seat base including a seat-support frame that is adapted to support a juvenile seat and to lie in an installed position on a seat bottom and seat back of a passenger seat provided with a seat bight formed at a junction between the seat bottom and seat back, the juvenile-seat base also including a restorative frame tether mounted to the seat-support frame for pivotable movement about a high-elevation horizontal frame-pivot axis and arranged to extend downwardly from the high-elevation horizontal frame-pivot axis toward the seat bottom of the passenger seat when the seat-support frame lies in the installed position on the passenger seat, and wherein the restorative frame tether is configured to provide means for mating with an underside of a passenger-seat lap belt associated with the passenger seat to establish an actual belt path of the passenger-seat lap belt while the passenger-seat belt remains in a relatively lower low-elevation position in close proximity to the seat bight and below and in spaced-apart relation to the high-elevation horizontal frame-pivot axis and for yieldably returning the seat-support frame automatically to the installed position on the seat bottom and seat back of the passenger seat owing to pivotable movement of the restorative frame tether about the high-elevation horizontal frame-pivot axis after movement of the seat-support frame from the installed position to a temporary displaced position on the passenger seat during exposure of the passenger seat to external forces, wherein the restorative frame tether includes a belt mount adapted to engage a portion of the underside of the passenger-seat lap belt, a first frame-tether linkage having a lower end pivotably coupled to a first end of the belt mount and an opposite upper end pivotably coupled to a first side of the seat-support frame at a first elevated pivot point that is located on the high-elevation horizontal frame-pivot axis, and a second frame-tether linkage having a lower end pivotably coupled to an opposite second end of the belt mount and an opposite upper end pivotably coupled to an opposite second side of the seat-support frame at a second elevated pivot point that is located on the high-elevation horizontal frame-pivot axis and arranged to lie in spaced-apart relation to the first elevated pivot point to define a virtual belt path therebetween and along the high-elevation horizontal frame-pivot axis.

3. The child restraint of claim 2, further comprising a juvenile seat formed to include a child-receiving space and coupled to the seat-support frame to lie in a stationary position and wherein an outer portion of the juvenile seat extends into a seat-receiving cavity formed in the seat support frame to position the outer portion above the belt mount, between the first and second frame-tether linkages, and below the first and second elevated pivot points.

4. The child restraint of claim 2, wherein the first-side frame-tether linkage includes a first rod-support plate associated with the first side of the seat-support frame, a first-plate pivot axle arranged to mate with the first side of the seat-support frame and support the rod-support plate for pivotable movement about the high-elevation horizontal frame-pivot axis, and at least one spring-loaded extensible frame-tether rod arranged to extend between and mate with each of the first end of the belt mount and the first rod-support plate.

5. The child restraint of claim 4, wherein the second-side frame-tether linkage includes a second rod-support plate associated with the second side of the seat-support frame, a second-plate pivot axle arranged to mate with the second side of the seat-support frame and support the rod-support plate for pivotable movement about the high-elevation horizontal frame-pivot axis, and at least one spring-loaded extensible frame-tether rod arranged to extend between and mate with each of the second end of the belt mount and the second rod-support plate.

6. The child restraint of claim 2, wherein the belt mount includes a convex outwardly facing topside belt-support surface adapted to engage a portion of the underside of the passenger-seat lap belt normally to hold the belt mount against the passenger seat to establish the installed position of the seat-support frame on the passenger seat and wherein each of the spring-loaded extensible frame-tether rods is lengthened temporarily to load a spring included therein during limited forward movement of the seat-support frame on the seat bottom of the passenger seat and away from the seat back and the seat bight following exposure of the passenger seat to an external impact and then shortened following unloading of the spring included in each of the spring-loaded extensible frame-support rods to apply a downward force to the seat-support frame to cause the seat-support frame to be pivoted about the horizontal frame-pivot axis and moved downwardly toward the passenger seat from the temporary displaced position to the installed position.

7. The child restraint of claim 2, wherein the first-side and second-side spring-biased extensible frame-tether rods cooperate to provide means for yieldably drawing the seat-support frame downwardly toward the belt mount and also toward the seat bottom, seat back, and seat bight when the seat-support frame is retained in the installed position.

8. The child restraint of claim 2, further comprising a juvenile seat coupled to the seat-support frame and wherein the first-side and second-side spring-biased extensible frame-tether rods cooperate to provide a space therebetween for receiving a portion of the juvenile seat and means for transferring a downward force exerted on the belt mount by a passenger-seat lap belt mated with an outwardly facing topside belt-support surface of the belt mount to the seat-support frame at the elevated pivot points so as to establish an elevated virtual belt path that lies above the actual belt path and extends in part, along the horizontal frame-pivot axis between the first and second pivot points so that more room is provided between the first and second sides of the seat-support frame to allow for a lowest possible position of the juvenile seat in the seat-support frame and the seat-support frame can be retained in a low position on the passenger seat to keep the center of gravity of the child restraint close to the seat bottom of the passenger seat.

* * * * *